United States Patent
Meredith et al.

(10) Patent No.: US 6,678,279 B1
(45) Date of Patent: Jan. 13, 2004

(54) SYSTEM AND METHOD TO IMPLEMENT A PACKET SWITCH BUFFER FOR UNICAST AND MULTICAST DATA

(75) Inventors: Jim Meredith, Westford, MA (US); Paul Gallo, Newton, MA (US); Nanying Yin, Lincoln, MA (US); Heather Achilles, Hudson, NH (US); Mike Fortuna, Fremont, NH (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/460,275

(22) Filed: Dec. 13, 1999

(51) Int. Cl.[7] .................................................. H01L 12/28
(52) U.S. Cl. ........................................ 370/413; 370/419
(58) Field of Search ................................ 370/412–418, 370/419, 462, 389, 392; 710/29

(56) References Cited

U.S. PATENT DOCUMENTS

| | | | |
|---|---|---|---|
| 4,500,987 A | * 2/1985 | Hasegawa | ................... 370/462 |
| 5,235,595 A | * 8/1993 | O'Dowd | ..................... 370/392 |
| 5,361,256 A | 11/1994 | Doeringer et al. | |
| 5,406,556 A | 4/1995 | Widjaja et al. | |
| 5,440,553 A | 8/1995 | Widjaja et al. | |
| 5,517,494 A | 5/1996 | Green | |
| 5,535,197 A | 7/1996 | Cotton | |
| 5,805,589 A | * 9/1998 | Hochschild et al. | ........ 370/413 |
| 6,032,205 A | * 2/2000 | Ogimoto et al. | ............ 370/419 |
| 6,192,422 B1 | * 2/2001 | Daines et al. | ................. 710/29 |
| 6,275,491 B1 | * 8/2001 | Prasad et al. | ............... 370/389 |
| 6,337,860 B1 | * 1/2002 | Wicklund | ................... 370/417 |

* cited by examiner

Primary Examiner—Salvatore Cangialosi
(74) Attorney, Agent, or Firm—Blakely Sokoloff Taylor & Zafman LLP

(57) ABSTRACT

The present invention provides a system and method to implement a packet switch buffer for unicast and multicast data. Incoming data packets are first stored in an input buffer memory. These data packets are examined to determine where in a primary output memory to place the data packets. The data packets are then transferred from the input buffer memory to the primary output memory. Afterward, the data packets are transferred from the primary output memory to a secondary output memory, and then from the secondary output memory to line card interface units (LCIUs).

33 Claims, 6 Drawing Sheets

SYSTEM AND METHOD TO IMPLEMENT A PACKET SWITCH BUFFER FOR UNICAST AND MULTICAST DATA

FIELD OF THE INVENTION

The present invention generally relates to packet switches, and particular to a system and method to implement a packet switch buffer for unicast and multicast data.

BACKGROUND

Packet switches are typically implemented within the various layers of a standard Open System Interconnection (OSI) Model which general networks use in order to allow data communication within a network environment. The typical packet switches contained in the standard OSI Model network are designed to provide the three lower-layer services to the respective subscribers (namely a physical layer, a data link layer, and a network layer).

Accordingly, data packets or data cells are routed through the various layers of the OSI Model network by the respective packet switches of the standard network system. As data packet traffic within a network system increases, the need for a high data packet transfer rate becomes increasingly important to the proper overall operations of the network. It is therefore desirable to provide a packet switch that can provide a high data packet transfer rate.

SUMMARY OF THE INVENTION

The present invention provides a system and method to implement a packet switch buffer for unicast and multicast data. Incoming data packets are first stored in an input buffer memory. These data packets are examined to determine where in a primary output memory to place the data packets. The data packets are then transferred from the input buffer memory to the primary output memory. Afterward, the data packets are transferred from the primary output memory to a secondary output memory, and then from the secondary output memory to line card interface units (LCIUs).

In accordance with one embodiment of the present invention, an output buffer system includes a primary output memory to store data packets. The output buffer system also includes a secondary output memory, which is configured to store data packets transferred from the first output memory. In addition, the output buffer system includes a scheduler, which is coupled between the primary output memory and the secondary output memory. The scheduler facilitates the transfer of data packets from the primary output memory to the secondary output memory.

The above described and many other features of the present invention will become apparent as the invention becomes better understood by reference to the following detailed description when considered in conjunction with the accompanying drawings.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Figure 1A:
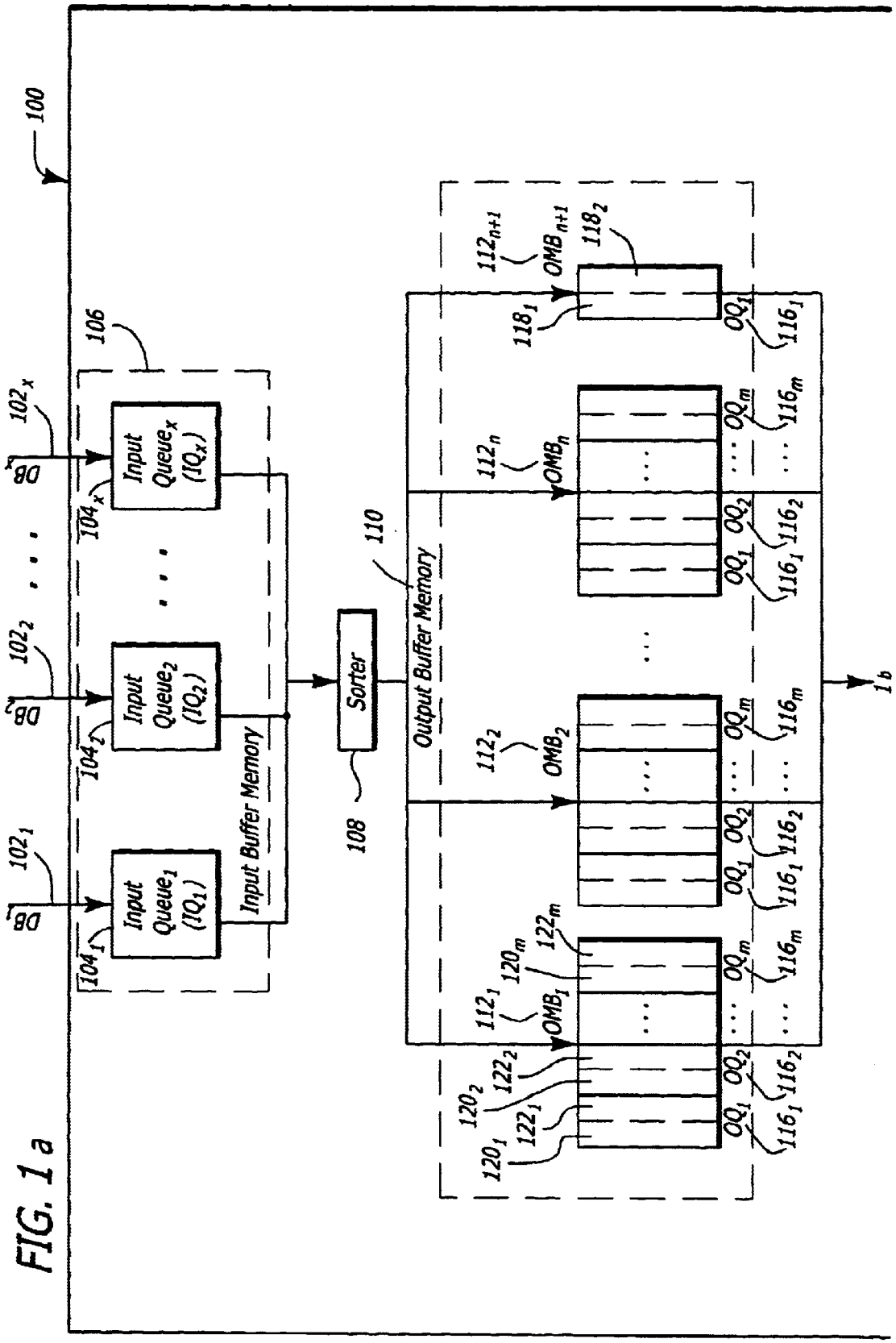
FIGS. 1a and 1b illustrate an embodiment of a packet switch in accordance with the teachings of the present invention.
Figure 1B:
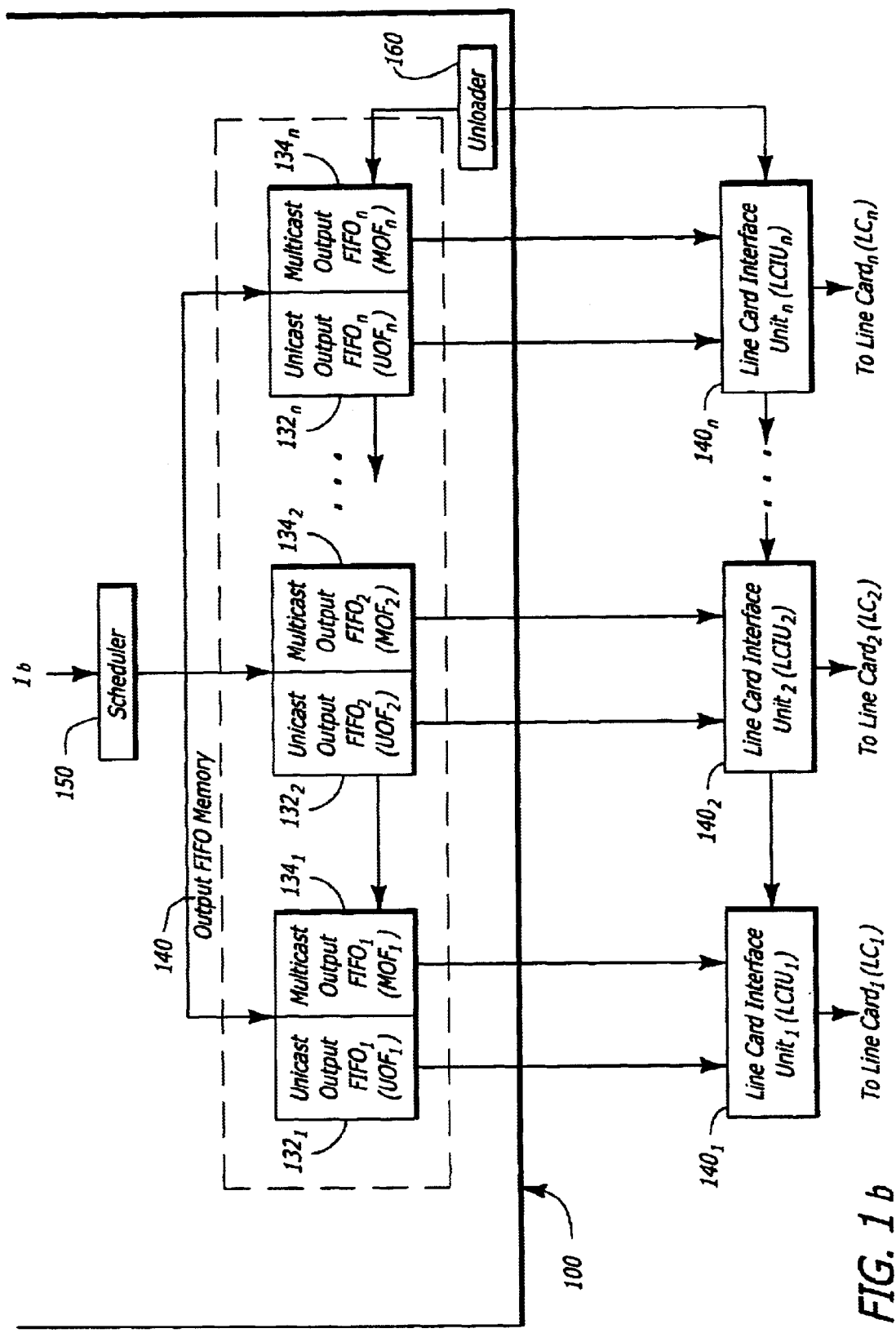

FIGS. 1a and 1b show a block diagram of one embodiment of a packet switch system 100 in accordance with the present invention. In FIG. 1a, the packet switch system includes "x" data buses ($DB_1$, $DB_2$, ..., $DB_x$) $102_1$–$102_x$, where "x" is a positive whole number. These data buses ($DB_1$, $DB_2$, ..., $DB_x$) $102_1$–$102_x$ are operatively coupled to "x" input queues ($IQ_1$, $IQ_2$, ..., $IQ_x$) $104_1$–$104_x$, which are located in input buffer memory 106. In one embodiment, input queues ($IQ_1$, $IQ_2$, ..., $IQ_x$) $104_1$–$104_x$ are implemented as First-In-First-Out (FIFO) queues.

Data buses ($DB_1$, $DB_2$, ..., $DB_x$) $102_1$–$102_x$ supply data to input queues ($IQ_1$, $IQ_2$, ..., $IQ_x$) $104_1$–$104_x$ in the form of data packets or cells. Each data bus $102_1$–$102_x$ supplies data to a designated corresponding input queue. For example, $DB_1$ $102_1$ supplies data to $IQ^1$ $104_1$; $DB_2$ $102_2$ supplies data to $IQ_2$ $104_2$; and $DB_x$ $102_x$ supplies data to $IQ_x$ $104_x$. The writing of incoming data into input queues ($IQ_1$, $IQ_2$, ..., $IQ_x$) $104_1$–$104_x$ is controlled and synchronized so that data available from data buses ($DB_1$, $DB_2$, ..., $DB_x$) $102_1$–$102_x$ at one instance in time can generally be written simultaneously into the input queues ($IQ_1$, $IQ_2$, ..., $IQ_x$) $104_1$–$104_x$ in one write cycle.

Packet switch system 100 further includes sorter 108, which is operatively coupled to input buffer memory 106 and output buffer memory 110. Sorter 108 facilitates the transfer of data packets from input queues ($IQ_1$, $IQ_2$, ..., $IQ_x$) $104_1$–$104_x$ to "n+1" output memory blocks ($OMB_1$, $OMB_2$, ..., $OMB_n$, $OMB_{n+1}$) $112_1$–$112_{n+1}$, where "n" is a positive whole number. Output memory blocks ($OMB_1$, $OMB_2$, ..., $OMB_n$, $OMB_{n+1}$) are located in output buffer memory 110. Input queues ($IQ_1$, $IQ_2$, ..., $IQ_x$) $104_1$–$104_x$ generally serve as a temporary storage space where a sufficient amount of input data can be gathered prior to being transferred to output memory blocks ($OMB_1$, $OMB_2$, ..., $OMB_n$, $OMB_{n+1}$) $112_1$–$112_{n+1}$ in output buffer memory. In one embodiment, data packets are transferred to output memory blocks ($OMB_1$, $OMB_2$, ..., $OMB_n$, $OMB_{n+1}$) $112_1$–$112_{n+1}$ in 176-bit words. In this embodiment, incoming data is accumulated in input queues ($IQ_1$, $IQ_2$, ..., $IQ_x$) $104_1$–$104_x$ until 176 bits of data are available to be transferred to output memory blocks ($OMB_1$, $OMB_2$, ..., $OMB_n$, $OMB_{n+1}$) $112_1$–$112_{n+1}$.

As stated above, data buses ($DB_1$, $DB_2$, ..., $DB_x$) $102_1$–$102_x$ supply data to input queues ($IQ_1$, $IQ_2$, ..., $IQ_x$) $104_1$–$104_x$ in the form of data packets. Each data packet contains an output destination parameter and a priority parameter. In one embodiment, the output destination and priority parameters may be incorporated into a header portion of each data packet. As will be described below in more details, the output destination and priority parameters dictate where the data packet will be placed in output buffer memory. Sorter 108 examines the output destination and priority parameters contained in each data packet to determine where in output buffer memory 110 to place the data packet.

Output buffer memory 110 includes a plurality of output memory blocks ($OMB_1$, $OMB_2$, ..., $OMB_n$, $OMB_{n+1}$) $112_1$–$112_{n+1}$. In one embodiment, unicast output memory blocks ($OMB_1$, $OMB_2$, ..., $OMB_n$) $112_1$–$112_n$ are configured to store unicast data packets. Each of these unicast data packets is destined for one corresponding output destination. An example of an output destination may be a line card ($LC_1$, $LC_2$, ..., $LC_n$) (not shown). Accordingly in one embodiment, $OMB_1$ $112_1$ stores unicast data packets destined for $LC_1$; $OMB_2$ $112_2$ stores unicast data packets destined for $LC_2$; and $OMB_n$ $112_n$ stores unicast data packets destined for $LC_n$. Each line card (LC) is a plug-in electronic printed circuit (PC) card that provides a physical line interface for Ethernet or other serial line interface.

In one embodiment, each unicast output memory block ($OMB_1$, $OMB_2$, ..., $OMB_n$) $112_1$–$112_n$ is divided into several output queues, using the following characteristics: output time slice and output destination. In the embodiment of FIGS. 1a and 1b, each output memory block is divided into "m" output queues ($OQ_1$, $OQ_2$, ..., $OQ_m$) $116_1$–$116_m$, where "m" is a positive whole number. In this embodiment, a time division multiplexing (TDM) scheme is used to unload data packets from output queues ($OQ_1$, $OQ_2$, ..., $OQ_m$) $116_1$–$116_m$. In the TDM scheme, each output queue ($OQ_1$, $OQ_2$, ..., $OQ_m$) $116_1$–$116_m$ is assigned a time slice ($TS_1$, $TS_2$, ..., $TS_m$) when data packets from the output queue is transferred to output FIFO memory 130. Accordingly, data packets stored in $OQ_1$ $116_1$ are transferred during $TS_1$; data packets stored in $OQ_2$ $116_2$ are transferred during $TS_2$; and data packets stored in $OQ_m$ $116_m$ are transferred during $TS_m$.

Referring to FIG. 1b, unicast data packets in ($OMB_1$, $OMB_2$, ..., $OMB_n$) $112_1$–$112_n$ will be transferred to unicast output FIFOs ($UOF_1$, $UOF_2$, ..., $UOF_n$) $132_1$–$132_n$, which are located in output FIFO memory 130, as will be described below in more details. These unicast data packets will eventually be unloaded from unicast output FIFOs ($UOF_1$, $UOF_2$, $UOF_n$) $132_1$–$132_n$ and forwarded to line card interface units ($LCIU_1$, $LCIU_2$, ..., $LCIU_n$) $140_1$–$140_n$. Each LCIU $140_1$–$140_n$ generally converts the forwarded data packets to a format that a line card (LC) can accept, and forwards the converted data packets to the line cards.

In one embodiment, each LCIU ($LCIU_1$, $LCIU_2$, ..., $LCIU_n$) $140_1$–$140_n$ serializes the data packets so that the data packets can be forwarded to a corresponding line card (LC) through a series of serial ports or connections on the line card (LC). As illustrated, $LCIU_1$ $140_1$ forwards or supplies data to $LC_1$; $LCIU_2$ $140_2$ supplies data to $LC_2$; and $LCIU_n$ $140_n$ forwards data to $LC_n$. In this embodiment, data packets destined for each port or connection on the line card are unloaded and transferred during a pre-assigned time slice (TS). For example, data packets destined for the first port or Port 1 on $LC_1$ are stored in $OQ_1$ $116_1$ in $OMB_1$ $112_1$. Furthermore, these data packets are unloaded from $OQ_1$ $116_1$ in $OMB^1$ $112_1$ and transferred to output FIFO memory 130 during $TS_1$.

In one embodiment, output queues ($OQ_1$, $OQ_2$, ..., $OQ_m$) $116_1$–$116_m$ in output memory blocks ($OMB_1$, $OMB_2$, ..., $OMB_n$) $112_1$–$112_n$ are divided into queue sections $120_1$–$120_m$ and $122_1$–$122_m$ according to data packet priority, including high-priority (HP) and low-priority (LP), as shown in FIG. 1a. High-priority (HP) queue sections $120_1$–$120_m$ are configured to store high-priority data packets; and low-priority (LP) queue sections $122_1$–$122_m$ are configured to store low-priority packets. As an example, high-priority data packets, which are to be unloaded during $TS_1$ and which are destined for $LC_1$, should be stored in the ($LC_1$, $TS_1$, HP) queue section $120_1$ of $OQ_1$ $116_1$ in $OMB_1$ $112_1$. As another example, low-priority data packets, which are to be unloaded at $TS_m$ and which are destined for Port "m" of $LC_n$, should be placed into the ($LC_n$, $TS_m$, LP) queue section $122_m$ of $OQ_m$ $116_m$ in $OMB_n$ $112_n$.

Output buffer memory 110 also includes multicast output memory block ($OMB_{n+1}$) $112_{n+1}$, which is adapted to store multicast data packets. Each multicast data packet is destined for a group of output destinations or line cards ($LC_1$, $LC_2$, ..., $LC_n$). Accordingly, each multicast data packet may be destined for all of the line cards ($LC_1$, $LC_2$, ..., $LC_n$) or a subset of those line cards. Multicast output memory block ($OMB_{n+1}$) $112_{n+1}$ is divided into queue sections $118_1$ and $118_2$ according to data packet priority. Thus, $OMB_{n+1}$ $112_{n+1}$ includes a (Multicast, HP) queue section $118_1$ to store high-priority, multicast data packets, and a (Multicast, LP) queue section $118_2$ to store low-priority, multicast data packets.

Returning to FIG. 1b, packet switch system 100 also includes scheduler 150, which is operatively coupled between output memory blocks ($OMB_1$, $OMB_2$, ..., $OMB_n$) $112_1$–$112_n$ and output First-In-First-Out (FIFO) memory 130. Scheduler 150 unloads or extracts data packets from output memory blocks ($OMB_1$, $OMB_2$, ..., $OMB_n$) $112_1$–$112_n$, and transfers these data packets to output FIFOs ($UOF_1$, $UOF_2$, ..., $UOF_n$, $MOF_1$, $MOF_2$, ..., $MOF_n$) $132_1$–$132_n$ and $134_1$–$134_n$.

Output FIFOs ($UOF_1$, $UOF_2$, ..., $UOF_n$) $132_1$–$132_n$ are referred to as unicast output FIFOs (UOF). Each unicast output FIFO ($UOF_1$, $UOF_2$, ..., $UOF_n$) $132_1$–$132_n$ is configured to store data packets destined for one output destination or line card (LC) (not shown). Accordingly, $UOF_1$ $132_1$ stores unicast data packets destined for $LC_1$; $UOF_2$ $132_2$ stores unicast data packets destined for $LC_2$; and $UOF_n$ $132_n$ stores unicast data packets destined for $LC_n$. As described above and illustrated in FIG. 1a, $OMB_1$ $112_1$ stores unicast data packets destined for $LC_1$; $OMB_2$ $112_2$ stores unicast data packets destined for $LC_2$; and $OMB_n$ $112_n$ stores unicast data packets destined for $LC_n$. Thus when scheduler 150 transfers data packets from output buffer memory 110 to output FIFO memory 130, data packets from $OMB_1$ $112_1$ are transferred to $UOF_1$ $132_1$; data packets from $OMB_2$ $112_2$ are transferred to $UOF_2$ $132_2$; and data packets from $OMB_n$ $112_n$ are transferred to $UOF_n$ $132_n$.

Output FIFOs ($MOF_1$, $MOF_2$, ..., $MOF_n$) $134_1$–$134_n$ are referred to as multicast output FIFOs. As stated above, each multicast data packet is destined for a group of output destinations. Each multicast output FIFO ($MOF_1$, $MOF_2$, ..., $MOF_n$) $134_1$–$134_n$ is configured to store multicast data packets that include a corresponding line card in the group of output destinations for which the multicast data packets are destined. Accordingly, $MOF_1$ $134_1$ stores multicast data packets that include $LC_1$ as an output destination; $MOF_2$ $134_2$ stores multicast data packets that include $LC_2$ as an output destination; and $MOF_n$ $134_n$ stores multicast data packets destined that include $LC_n$ as an output destination.

As described above and illustrated in FIGS. 1a and 1b, $OMB_{n+1}$ $112_{n+1}$ stores multicast data packets destined for a group of output destinations or line cards ($LC_1$, $LC_2$, ..., $LC_n$). Thus when data packets from $OMB_{n+1}$ $112_{n+1}$ are transferred to output FIFO memory 130, multicast data packets destined for $LC_1$ are transferred to $MOF_1$ $134_1$;

multicast data packets destined for $LC_2$ are transferred to $MOF_2$ $134_2$; and multicast data packets destined for $LC_n$ are transferred to $MOF_n$ $134_n$. It should be noted that a multicast data packet destined for a group of line cards is read once out of $OMB_{n+1}$ $112_{n+1}$ and written in all multicast FIFOs corresponding to those destined line cards.

Scheduler 150 unloads or extracts data packets from output memory blocks ($OMB_1$, $OMB_2$, ..., $OMB_n$, $OMB_{n+1}$) $112_1$–$112_{n+1}$, and transfers these extracted data packets to output FIFO memory 156 in accordance with a predetermined service sequence. It should be noted that the transfer of data packets from output memory blocks ($OMB_1$, $OMB_2$, ..., $OMB_n$, $OMB_{n+1}$) $112_1$–$112_{n+1}$ to output FIFO memory 156 is also referred to as servicing the output memory blocks.

In one embodiment, scheduler 150 employs a cyclical or round-robin service sequence to service output memory blocks ($OMB_1$, $OMB_2$, ..., $OMB_n$, $OMB_{n+1}$) $112_1$–$112_{n+1}$. In the round-robin service sequence, scheduler 158 generally services output memory blocks ($OMB_1$, $OMB_2$, ..., $OMB_n$, $OMB_{n+1}$) $112_1$–$112_{n+1}$ during sequential block service periods 1 to n+1, wherein block service period 1 precedes block service period 2 and block service period n precedes block service period n+1. Accordingly, scheduler 158 services $OMB_1$ $112_1$ during block service period 1, $OMB_2$ $112_2$ during block service period 2, $OMB_n$ $112_n$ during block service period n, and $OMB_{n+1}$ $112_{n+1}$ during block service period n+1. The process of servicing output memory blocks ($OMB_1$, $OMB_2$, ..., $OMB_n$, $OMB_{n+1}$) $112_1$–$112_{n+1}$ in output buffer memory 110 is outlined in FIG. 3 and described below in the text accompanying FIG. 3.

During each block service period when a selected output memory block is serviced, scheduler 150 services output queues ($OQ_1$, $OQ_2$, ..., $OQ_m$) $116_1$–$116_m$ in the selected output memory block using a cyclical or round-robin service sequence. In using a cyclical or round-robin service sequence, scheduler 150 services output queues ($OQ_1$, $OQ_2$, ..., $OQ_m$) $116_1$–$116_m$ in sequential queue service periods 1 to m, wherein queue service period 1 precedes queue service period 2 and queue service period m-1 precedes queue service period m. Accordingly, scheduler 150 services $OQ_1$ $116_1$ of an output memory block during queue service period 1, $OQ_2$ $116_2$ of an output memory block during queue service period 2, and $OQ_m$ $116_m$ of an output memory block during block service period m.

When servicing a selected output queue ($OQ_1$, $OQ_2$, ..., $OQ_m$) $116_1$–$116_m$ in an output memory block ($OMB_1$, $OMB_2$, ..., $OMB_n$, $OMB_{n+1}$) $112_1$–$112_{n+1}$ during a queue service period, scheduler 158 unloads or extracts a maximum amount of bytes of data ($DP_{max}$) from the selected output queue. In extracting or unloading data packets from the selected output queue, scheduler 150 first extracts data packets from the high-priority (HP) queue section of the output queue. Scheduler 150 then extracts data packets from the low-priority (LP) queue section of the output queue being serviced, so that a total of $DP_{max}$ bytes of data are extracted or unloaded from the output queue. Accordingly, data extracted during a queue service period may come from both the high-priority (HP) queue section and low-priority (LP) queue section of the output queue being serviced. The process of servicing output queues ($OQ_1$, $OQ_2$, ..., $OQ_m$) $116_1$–$116_m$ is outlined in FIG. 4 and described below in the text accompanying FIG. 4.

Packet switch system 100 also includes unloader 160, which is operatively coupled to output FIFOs ($UOF_1$, $UOF_2$, ..., $UOF_n$, $MOF_1$, $MOF_2$, ..., $MOF_n$) $132_1$–$132_n$ and $134_1$–$134_n$ and line card interface units ($LCIU_1$, $LCIU_2$, ..., $LCIU_n$) $140_1$–$140_n$. Unloader 160 transfers data packets from output FIFOs ($UOF_1$, $UOF_2$, ..., $UOF_n$, $MOF_1$, $MOF_2$, ..., $MOF_n$) $132_1$–$132_n$ and $134_1$–$134_n$ to card interface units ($LCIU_1$, $LCIU_2$, ..., $LCIU_n$) $140_1$–$140_n$. As state above, ($LCIU_1$, $LCIU_2$, ..., $LCIU_n$) $140_1$–$140_n$ generally converts the data packets to a format which a line card (LC) can accept, and forwards the converted data packets to the line cards. In one embodiment, each LCIU $140_1$–$140_n$ serializes the data packets so that the data packets can be forwarded to a corresponding line card (LC) through a series of serial ports or connections on the line card (LC). As illustrated in FIGS. 1a and 1b, $LCIU_1$ $140_1$ forwards or supplies data to $LC_1$; $LCIU_2$ $140_2$ supplies data to $LC_2$; and $LCIU_n$ $140_n$ forwards data to $LC_n$.

The transfer of data packets from output FIFOs ($UOF_1$, $UOF_2$, ..., $UOF_n$, $MOF_1$, $MOF_2$, ..., $MOF_n$) $132_1$–$132_n$ and $134_1$–$134_n$ to line card interface units ($LCIU_1$, $LCIU_2$, ..., $LCIU_n$) $140_1$–$140_n$ is also referred to as servicing the output FIFOs. Unloader 160 employs a permit-based process to service output FIFOs ($UOF_1$, $UOF_2$, ..., $UOF_n$, $MOF_1$, $MOF_2$, ..., $MOF_n$) $132_1$–$132_n$ and $134_1$–$134_n$. In the permit-based process, unloader 160 extracts a maximum amount of bytes of unicast data ($DP_{max\_unicast}$) from unicast output FIFOs ($UOF_1$, $UOF_2$, ..., $UOF_n$) $132^1$–$132_n$, and forwards these extracted unicast data to line card interface units ($LCIU_1$, $LCIU_2$, ..., $LCIU_n$) $140_1$–$140_n$. Unloader 160 then extracts a maximum amount of bytes of multicast data ($DP_{max\_multicast}$) from multicast output FIFOs ($MOF_1$, $MOF_2$, ..., $MOF_n$) $134_1$–$134_n$ and forwards the extracted multicast data to line card interface units ($LCIU_1$, $LCIU_2$, ..., $LCIU_n$) $140_1$–$140_n$. In one embodiment, $DP_{max\_unicast}$ and $DP_{max\_multicast}$ are set to at least 2056 bytes. It should be noted, however, that $DP_{max\_unicast}$ and $DP_{max\_multicast}$ are programmable values, which can be set to any values. In general, unloader 160 continually alternates between servicing unicast output FIFOs ($UOF_1$, $UOF_2$, ..., $UOF_n$) $132_1$–$132_n$ and servicing multicast output FIFOs ($MOF_1$, $MOF_2$, ..., $MOF_n$) $134_1$–$134_n$ in the manner described until the output FIFOs are empty. The process of servicing output FIFOs ($UOF_1$, $UOF_2$, ..., $UOF_n$, $MOF_1$, $MOF_2$, ..., $MOF_n$) $132_1$–$132_n$ and $134_1$–$134_n$ is outlined in FIG. 5 and further described below in the text accompanying FIG. 5.

Figure 2:
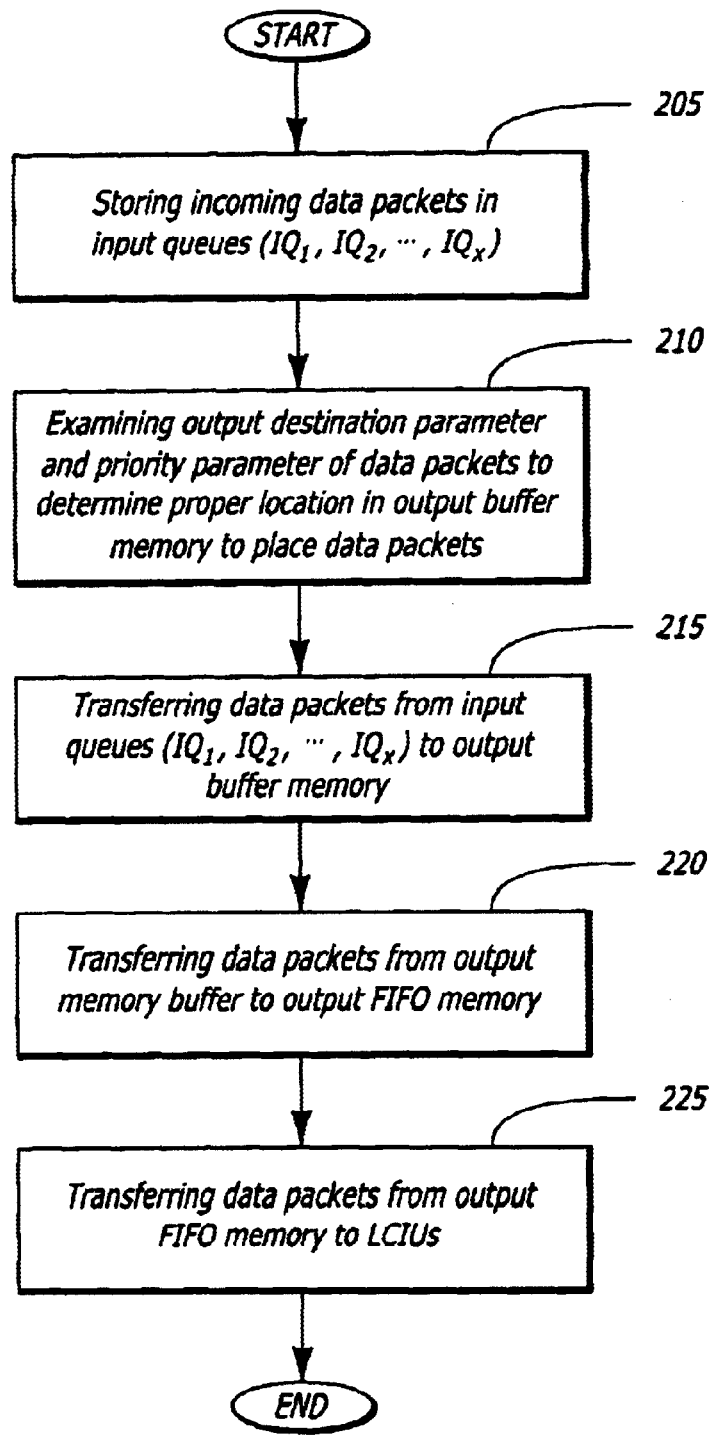
FIG. 2 outlines a method of operation of one embodiment of a packet switch buffer system in accordance with the teachings of the present invention.

FIG. 2 outlines a method of operation of one embodiment of a packet switch buffer system in accordance with the teachings of the present invention. In block 205, incoming data packets are received by the packet switch and temporarily written to input queues ($IQ_1$, $IQ_2$, ..., $IQ_x$). As described above, each data packet includes output destination and priority parameters dictating the proper location in the output buffer memory where the data packet should be transferred. The output destination and priority parameters associated with each data packet are examined in order to determine the appropriate location in the output buffer memory to place the data packet (block 210).

In block 215, data packets are transferred from input queues ($IQ_1$, $IQ_2$, ..., $IQ_x$) to the proper location in the output buffer memory based on the output destination and priority parameters associated with the data packets. For example, high-priority data packets, which are to be unloaded during $TS_1$ and which are destined for $LC_1$, should be placed into the ($LC_1$, $TS_1$, HP) output queue section of $OQ_1$ in $OMB_1$, as shown in FIG. 1a. Similarly, low-priority data packets, which are to be unloaded at $TS_m$ and which are destined for $LC_n$, should be placed into ($LC_n$, $TS_m$, LP) queue section of $OQ_m$ in $OMB_n$, as shown in FIG. 1a.

In block 220, data packets stored in the output buffer memory are transferred to the output FIFO memory. The process of transferring data packets from output memory blocks ($OMB_1$, $OMB_2$, ..., $OMB_n$, $OMB_{n+1}$) in the output buffer memory to the output FIFO memory is outlined in FIG. 3 and described below in the text accompanying FIG. 3.

In block 225, data packets stored in the output FIFO memory are transferred to line card interface units ($LCIU_1$, $LCIU_2$, ..., $LCIU_n$). The process of transferring data packets from output FIFOs ($UOF_1$, $UOF_2$, ..., $UOF_n$, $MOF_1$, $MOF_2$, ..., $MOF_n$) in the output FIFO memory to the line card interface units is outlined in FIG. 5 and described below in the text accompanying FIG. 5.

Figure 3:
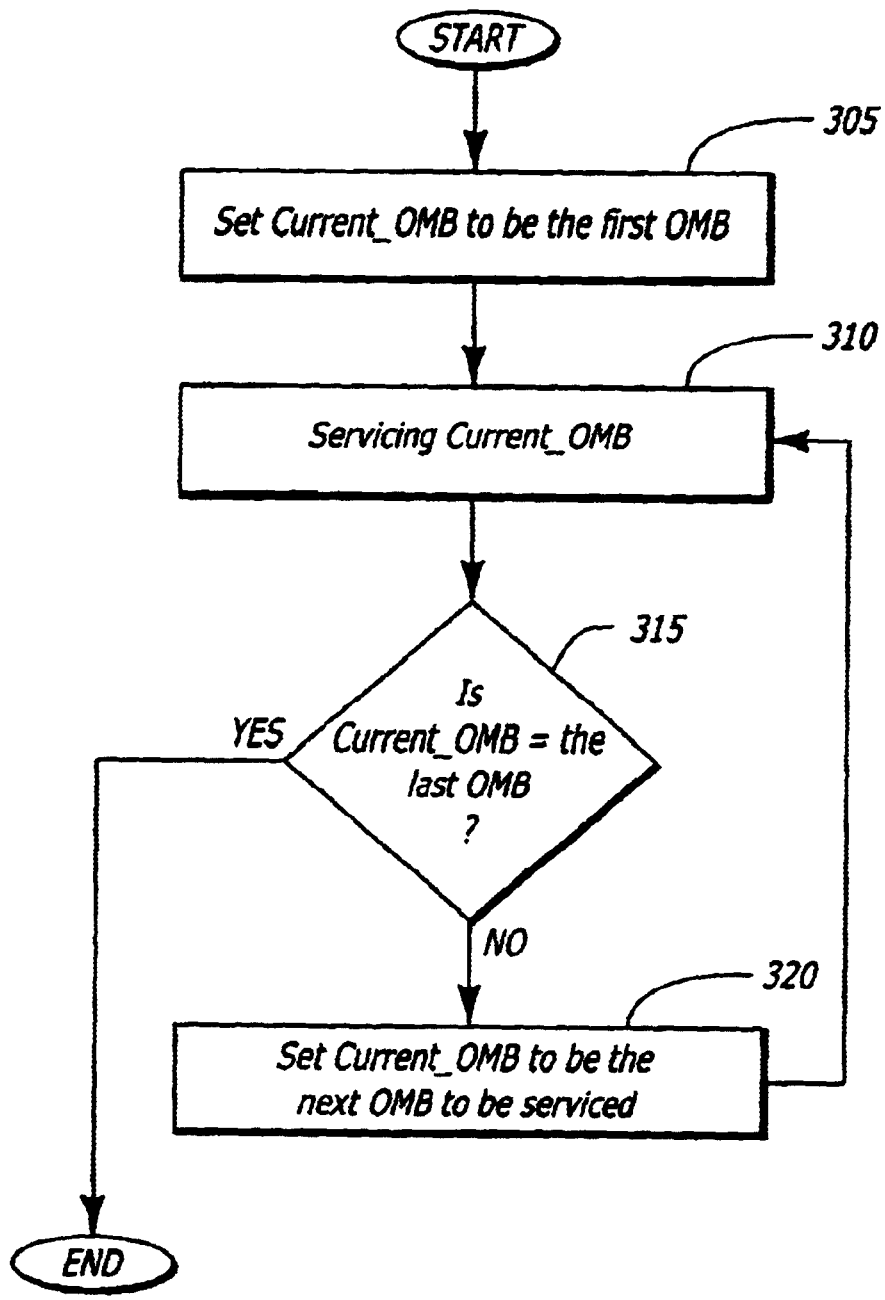
FIG. 3 outlines the process of extracting or unloading data packets from the output buffer memory.

FIG. 3 outlines the process of extracting or unloading data packets from the output buffer memory and transferring these extracted data packets to line card interface units ($LCIU_1$, $LCIU_2$, ..., $LCIU_n$). As stated above, data packets are extracted or unloaded from the output buffer memory in accordance with a predetermined cyclical or round-robin service sequence to service output memory blocks. As described above, output buffer memory includes a plurality of output memory blocks ($OMB_1$, $OMB_2$, ..., $OMB_n$, $OMB_{n+1}$). In general, data packets from output memory blocks ($OMB_1$, $OMB_2$, ..., $OMB_n$, $OMB_{n+1}$) are extracted or unloaded in accordance with a predetermined cyclical or round-robin service sequence. It should be noted that the unloading or extracting of data packets from an output memory block is also referred to as servicing the output memory blocks. In the round-robin service sequence, output memory blocks ($OMB_1$, $OMB_2$, ..., $OMB_n$, $OMB_{n+1}$) are sequentially serviced in sequential block service periods.

In block 305 of FIG. 3, Current_OMB is set equal to the first output memory block, or $OMB_1$. Current_OMB represents the output memory block being serviced. In block 310, data packets in Current_OMB are extracted or unloaded, as outlined in more details in FIG. 4. After Current_OMB is serviced, a query is performed to determine whether Current_OMB is equal to the last output memory block, or $OMB_{n+1}$ (block 315). If Current_OMB equals the last output memory block, or $OMB_{n+1}$, the extracting or unloading of data packets from the output buffer memory is completed. If Current_OMB does not equal the last output memory block or $OMB_{n+1}$, Current_OMB is set to the next OMB to be serviced. Blocks 310, 315, and 320 are then repeated.

Figure 4:
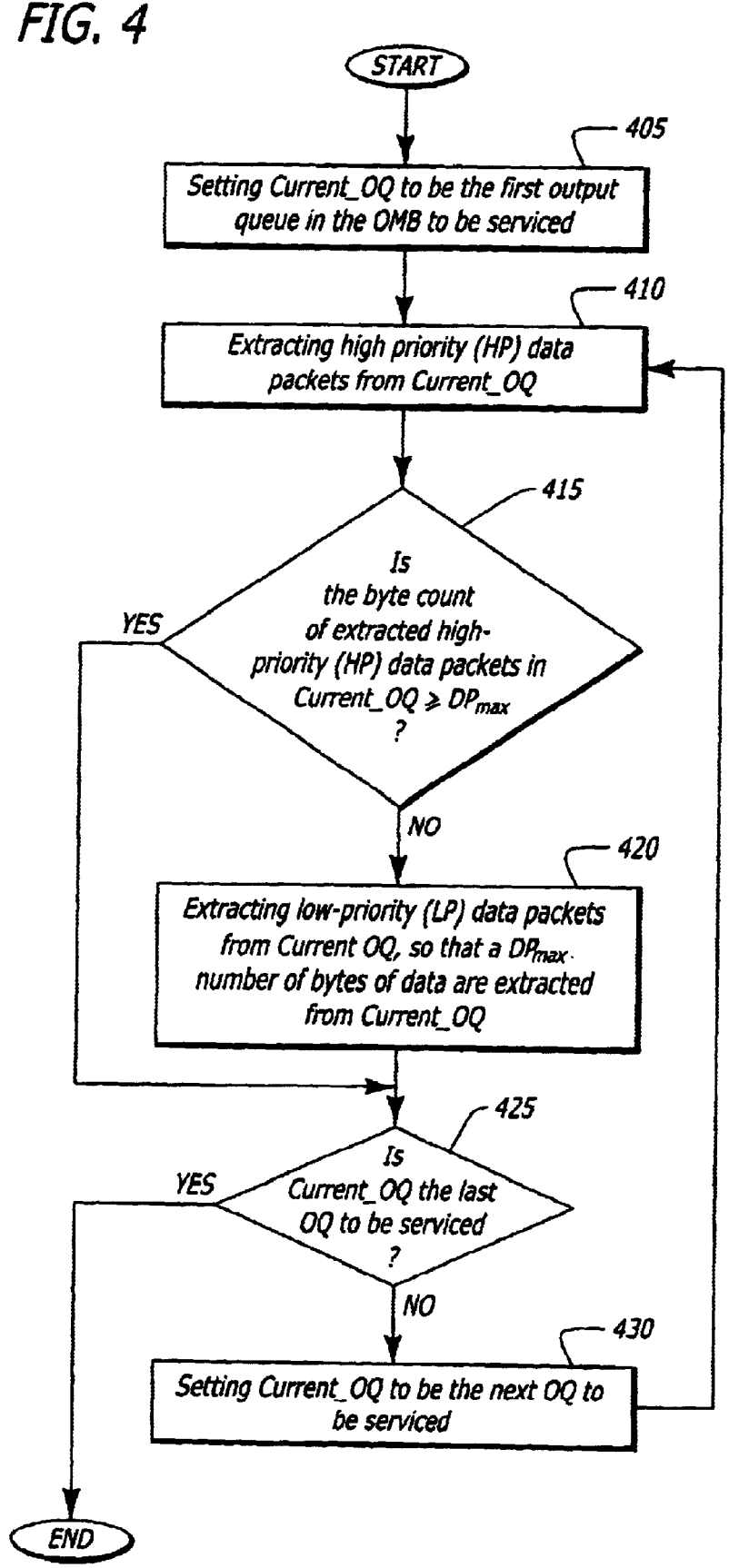
FIG. 4 outlines the process of unloading data packets from an output memory block.

FIG. 4 outlines the process of unloading data packets from an output memory block. In general during each block service period when an output memory block is serviced, output queues ($OQ_1$, $OQ_2$, ..., $OQ_m$) in that output memory block are serviced using a cyclical or round-robin service sequence. In using a cyclical or round-robin service sequence, output queues ($OQ_1$, $OQ_2$, ..., $OQ_m$) are sequentially serviced in sequential queue service periods 1 to m, wherein queue service period 1 precedes queue service period 2 and queue service period m−1 precedes queue service period m. Accordingly, $OQ_1$ is serviced during queue service period 1; $OQ_2$ is serviced during queue service period 2; and $OQ_m$ is serviced during block service period m.

In block 405 of FIG. 4, Current_OQ is set to the first output queue or $OQ_1$. Current_OQ represents the current output queue being serviced. When servicing the Current_OQ, a maximum amount of bytes of data ($DP_{max}$) are extracted from the Current_OQ. $DP_{max}$ is stored in a data structure referred to as a "permit." It should be noted that $DP_{max}$ is a programmable value that can be set to any values. In one embodiment, $DP_{max}$ may be set to at least 2056 bytes.

In extracting or unloading data packets from the output queue being serviced, data packets from the high-priority (HP) output queue section are first extracted or unloaded (block 410). If the byte count of the extracted high-priority data packets is not greater or equal to $DP_{max}$, data packets from the low-priority (LP) section are then extracted or unloaded, so that a total of $DP_{max}$ bytes of data are extracted or unloaded from the Current_OQ (block 420).

After the Current_OQ is serviced, a query is performed to determine whether Current_OQ is equal to the last output queue or $OQ_m$ (block 315). If Current_OQ is the last output memory block or $OQ_m$, the servicing of an output memory block is completed. If Current_OQ is not the last output queue ($OQ_n$) in the current output memory block being serviced, Current_OQ is set to the next output queue to be serviced. Blocks 410 through 430 are then repeated.

Figure 5:
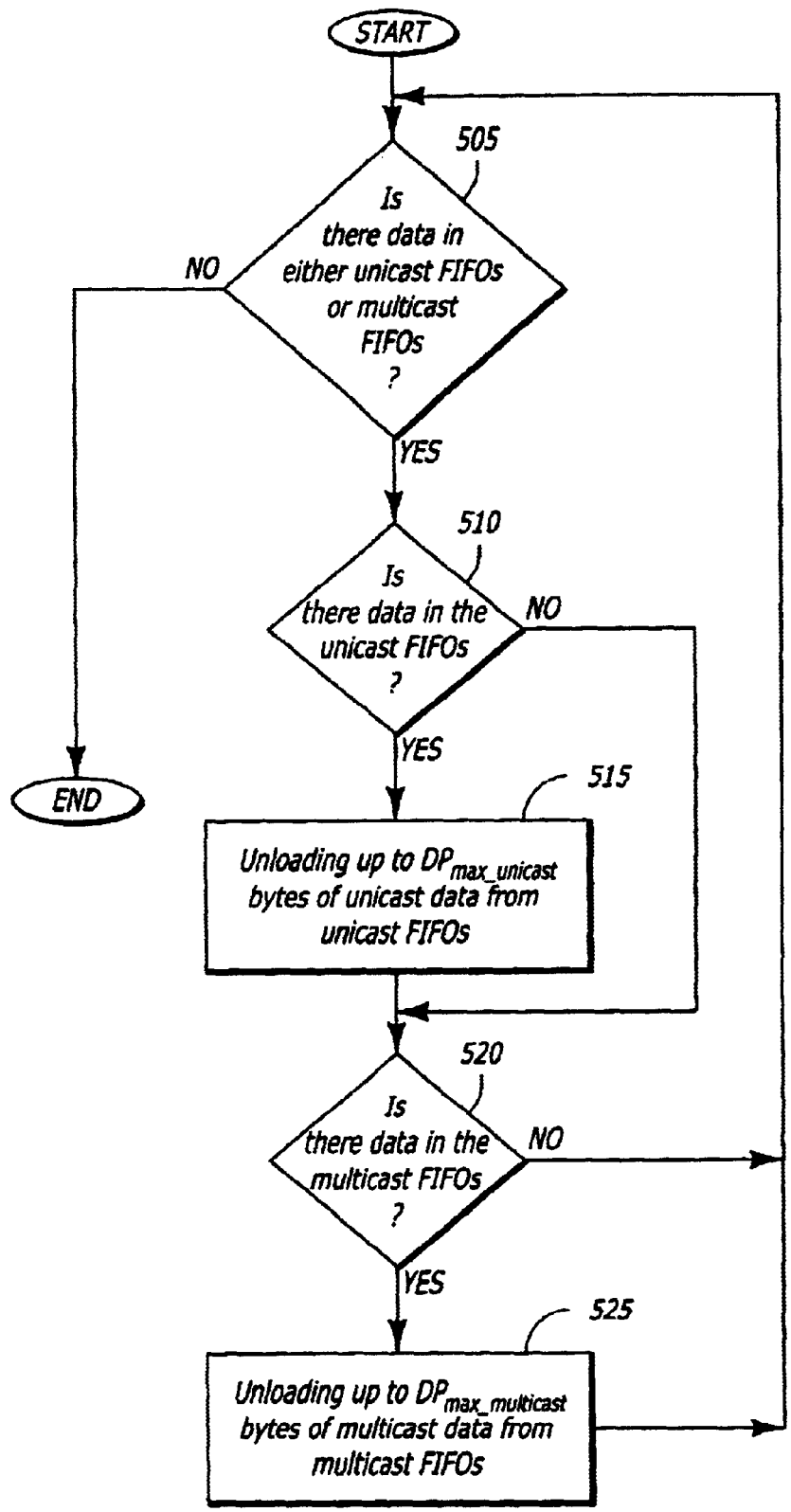
FIG. 5 outlines the process of servicing output FIFOs in a output First-In-First-Out (FIFO) memory.

FIG. 5 outlines the process of servicing output FIFOs ($UOF_1$, $UOF_2$, ..., $UOF_n$, $MOF_1$, $MOF_2$, ..., $MOF_n$). In block 505, a query is performed to determine whether data is available in the output FIFOs, including unicast output FIFOs ($UOF_1$, $UOF_2$, ..., $UOF_n$) and multicast output FIFOs ($MOF_1$, $MOF_2$, ..., $MOF_n$). If there is data in the output FIFOs, a query is performed to determine whether data is available in unicast output FIFOs ($UOF_1$, $UOF_2$, ..., $UOF_n$) (block 510). If there is data in unicast output FIFOs ($UOF_1$, $UOF_2$, ..., $UOF_n$), the sorter unloads or extracts a maximum amount ($DP_{max\_unicast}$) of bytes of unicast data from these unicast output FIFOs, and forwards the extracted unicast data to line card interface units ($LCIU_1$, $LCIU_2$, ..., $LCIU_n$) (block 515).

After the unicast output FIFOs have been serviced, a query is performed to determine whether there is data in multicast output FIFOs ($MOF_1$, $MOF_2$, ..., $MOF_n$) (block 520). If there is data in multicast output FIFOs ($MOF_1$, $MOF_2$, ..., $MOF_n$), the sorter unloads or extracts a maximum amount ($DP_{max\_multicast}$) of bytes of multicast data from the output multicast FIFOs, and forwards the extracted multicast data to line card interface units ($LCIU_1$, $LCIU_2$, ..., $LCIU_n$) (block 515). Blocks 505, 510, 515, 520, and 525 are then repeated. In general, sorter continually alternates between servicing unicast output FIFOs and servicing multicast output FIFOs as described in blocks 510, 515, 520, and 525 until these output FIFOs are empty.

Furthermore, it should be noted that $DP_{max\_unicast}$ and $DP_{max\_multicast}$ are programmable values, which can be set to any values. For example, $DP_{max\_unicast}$ and $DP_{max\_multicast}$ are set to at least 2056 bytes in one embodiment.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A packet switch system, comprising:
    an input buffer memory including a plurality of input queues configured to store data packets;
    a first output buffer memory operatively coupled to the input buffer memory and configured to store data packets transferred from the input buffer memory; and
    a second output memory operatively coupled to the first output buffer memory and configured to store data packets transferred from the first output buffer memory.

2. The packet switch system of claim 1, wherein the first output buffer memory includes:
   a plurality of output memory blocks; and
   each of the output memory blocks is configured to store data packets destined for a corresponding line card.

3. The packet switch system of claim 2, wherein:
   each of the output memory blocks includes a plurality of output queues;
   each of the output queues is configured to store data packets destined for a port on a corresponding line card; and
   each of the output queues includes a high-priority queue section to store high-priority data packets and a low-priority queue section to store low-priority data packets.

4. The packet switch system of claim 1, further comprising:
   a sorter coupled between the input buffer memory and the first output memory to facilitate transfer of data packets from the input buffer memory to the first output memory; and
   the sorter examining an output destination parameter and a priority parameter included in the data packets to determine where to store the data packets in the first output memory.

5. The packet switch system of claim 1, further comprising:
   a scheduler coupled between the first output memory and the second output memory to facilitate transfer of data packets from the first output memory to the second output memory.

6. The packet switch system of claim 5, wherein the scheduler employs a round-robin service sequence to extract data packets from output queues in output memory blocks in the first memory buffer.

7. The packet switch system of claim 6, wherein:
   the scheduler extracts data packets from the output queues in accordance with a permit in a permit-based service sequence; and
   the permit includes a maximum byte count of data that is to be extracted from an output queue.

8. The packet switch system of claim 1, wherein the second memory includes:
   a plurality of unicast output FIFOs configured to store unicast data packets; and
   a plurality of multicast output FIFOs configured to store multicast data packets.

9. The packet switch system of claim 1, further comprising an unloader coupled between the second output memory and a plurality of line card interface units to transfer data packets from the second output memory to the line card interface units.

10. An output buffer system in a packet switch, comprising:
    a primary output memory to store data packets;
    a secondary output memory to store data packets transferred from the first output memory; and
    a scheduler coupled between the primary output memory and the secondary output memory to facilitate transfer of data packets from the primary output memory to the secondary output memory.

11. The output buffer system of claim 10, wherein the primary output memory includes:
    a plurality of output memory blocks; and
    each of the output memory blocks is configured to store data packets destined for a corresponding line card.

12. The output buffer system of claim 11, wherein:
    each of the output memory blocks includes a plurality of output queues;
    each of the output queues is configured to store data packets destined for a port on a corresponding line card; and
    each of the output queues includes a high-priority queue section to store high-priority data packets and a low-priority queue section to store low-priority data packets.

13. The output buffer system of claim 10, wherein the secondary output memory includes:
    a plurality of unicast output FIFOs (First-In-First-Out) to store unicast data packets; and
    a plurality of multicast output FIFOs (First-In-First-Out) to store multicast data packets.

14. The output buffer system of claim 13, wherein:
    the unicast data packets are data packets destined for one output destination; and
    the multicast data packets are data packets destined for a group of output destinations.

15. The output buffer system of claim 10, further comprises an unloader coupled between the secondary output memory and a plurality of line card interface units (LCIUs) to facilitate transfer of data packets from the secondary output memory to the LCIUs.

16. The output buffer system of claim 15, wherein:
    the unloader alternates between servicing unicast output FIFOs in the secondary output memory and servicing multicast output FIFOs in the secondary output memory in accordance with a permit-based service sequence.

17. The output buffer system of claim 15, wherein:
    the unloader extracts data packets from the secondary output memory in accordance with a permit in a permit-based service sequence; and
    the permit includes a maximum byte count of unicast data that is to be extracted from unicast output FIFOs in the secondary output memory.

18. The output buffer system of claim 15, wherein:
    the unloader extracts data packets from the secondary output memory in accordance with a permit in a permit-based service sequence; and
    the permit includes a maximum byte count of multicast data that is to be extracted from multicast output FIFOs in the secondary output memory.

19. A method of switching data packets, comprising:
    storing incoming data packets in an input buffer memory;
    examining an output destination parameter included in the data packets to determine where to place the data packets in an output buffer memory;
    transferring data packets from the input buffer memory to the output buffer memory;
    transferring data packets from the output buffer memory to an output First-In-First-Out (FIFO) memory; and
    transferring data packets from the output FIFO memory to a plurality of line card interface units (LCIUs).

20. The method of claim 19, further comprising:
    examining a priority parameter included in the data packets to determine where to place the data packets in the output buffer memory.

21. The method of claim 19, further comprising:
transferring data packets from the input buffer memory to the output buffer memory, such that data packets destined for a port on a line card are written in an output queue corresponding to the port.

22. The method of claim 21, further comprising:
transferring data packets from the input buffer memory to the output buffer memory, such that high-priority data packets destined for a port on the line card are written in a high-priority queue section of an output queue corresponding to the port.

23. The method of claim 21, further comprising:
transferring data packets from the input buffer memory to the output buffer memory, such that low-priority data packets destined for a port on the line card are written in a low-priority queue section of an output queue corresponding to the port.

24. The method of claim 19, further comprising:
employing a permit-based service sequence to transfer data packets from the output FIFO memory to the LCIUs.

25. The method of claim 19, wherein the transferring data packets from the output FIFO memory to the LCIUs includes:
alternating between servicing unicast FIFOs and servicing multicast FIFOs in the output FIFO memory.

26. A computer program embodied on a computer-readable medium, comprising:
a primary output memory to store data packets;
a secondary output memory to store data packets transferred from the first output memory; and
a scheduler coupled between the primary output memory and the secondary output memory to facilitate transfer of data packets from the primary output memory to the secondary output memory.

27. A packet switch system, comprising:
means for storing incoming data packets in an input buffer memory;
means for examining an output destination parameter included in the data packets to determine where to place the data packets in an output buffer memory;
means for transferring data packets from the input buffer memory to the output buffer memory;
means for transferring data packets from the output buffer memory to an output First-In-First-Out (FIFO) memory; and
means for transferring data packets out of the output FIFO memory.

28. The system of claim 27, further comprising:
means for examining a priority parameter included in the data packets to determine where to place the data packets in the output buffer memory.

29. The system of claim 27, further comprising:
means for transferring data packets from the input buffer memory to the output buffer memory, such that data packets destined for a port on a line card are written in an output queue corresponding to the port.

30. The system of claim 29, further comprising:
means for transferring data packets from the input buffer memory to the output buffer memory, such that high-priority data packets destined for the port on the line card are written in a high-priority queue section of the output queue corresponding to the port.

31. The system of claim 29, further comprising:
means for transferring data packets from the input buffer memory to the output buffer memory, such that low-priority data packets destined for the port on the line card are written in a low-priority queue section of the output queue corresponding to the port.

32. The system of claim 27, further comprising:
means for employing a permit-based service sequence to transfer data packets from the output FIFO memory to a plurality of line card interface units (LCIUs).

33. The system of claim 27, further comprising:
means for alternating between servicing unicast FIFOs and servicing multicast FIFOs in the output FIFO memory.

* * * * *